(12) United States Patent
He et al.

(10) Patent No.: US 10,845,105 B2
(45) Date of Patent: Nov. 24, 2020

(54) ELECTRONIC EXPANSION VALVE WITH HIGH FLOW CONTROL PRECISION

(71) Applicant: ZHUJI YIBA ELECTRONIC VALVE CO., LTD., Zhejiang (CN)

(72) Inventors: Xiaoshui He, Zhejiang (CN); Huajun Chen, Zhejiang (CN); Yulong Chen, Zhejiang (CN)

(73) Assignee: ZHUJI YIBA ELECTRONIC VALVE CO., LTD., Zhejiang (CN)

( * ) Notice: Subject to any disclaimer, the term of this patent is extended or adjusted under 35 U.S.C. 154(b) by 141 days.

(21) Appl. No.: 16/304,149

(22) PCT Filed: Aug. 23, 2017

(86) PCT No.: PCT/CN2017/098581
§ 371 (c)(1),
(2) Date: Nov. 22, 2018

(87) PCT Pub. No.: WO2018/153040
PCT Pub. Date: Aug. 30, 2018

(65) Prior Publication Data
US 2020/0318876 A1    Oct. 8, 2020

(30) Foreign Application Priority Data

Feb. 22, 2017   (CN) .......................... 2017 1 0094423

(51) Int. Cl.
*F25B 41/06*     (2006.01)
*F16K 1/52*      (2006.01)
*F16K 31/06*     (2006.01)

(52) U.S. Cl.
CPC ............. *F25B 41/062* (2013.01); *F16K 1/52* (2013.01); *F16K 31/06* (2013.01); *F25B 2341/065* (2013.01)

(58) Field of Classification Search
CPC .... F25B 41/062; F25B 2341/065; F16K 1/52; F16K 31/04
See application file for complete search history.

(56) References Cited

U.S. PATENT DOCUMENTS 6,923,427 B2 *   8/2005   Yonezawa ............. F16K 31/047
                                                    251/129.11
8,157,184 B2 *   4/2012   Hayashi ................ F25B 41/062
                                                    236/92 B (Continued)

FOREIGN PATENT DOCUMENTS

CN        21088211      6/1992
CN        2781105       5/2006

(Continued)

*Primary Examiner* — Eric Keasel
(74) *Attorney, Agent, or Firm* — Law Offices of Steven W. Weinrieb

(57) ABSTRACT

An electronic expansion valve with high flow control precision, comprises a valve seat (1) and a valve rod (3). A through groove (11) penetrating the top and bottom of the valve seat is formed on the valve seat (1). A bearing seat (2) matching the through groove is inserted in the through groove (11). The bearing seat (2) includes a seat body (23), a through hole, (21) passing through the seat body, is formed in the seat body (3), and the through hole (21) matches the valve rod (3). An internal thread segment (24) is formed in the middle of the inner wall of the through hole (21). A matched straight tube is welded to the bottom of the through groove (11). The outer wall of the valve seat (1) is provided with a side hole communicated with the through groove (11), and a matching elbow pipe (4) is welded to the side hole. An isolating sleeve (10) is welded to the outer wall of the valve seat (1). A magnetic rotor (6) is provided outside the upper end of the valve rod (3) and a second circular groove (27) and a rectangular valve port (26) are formed on the outer wall of a lower end opening of the seat body (23). The (Continued)

electronic expansion valve can not only eliminate the lateral pressure generated by the valve rod under air pressure, but also improves the flow control precision, and therefore, the control and adjustment of the system are facilitated, and costs are reduced so as to meet market requirements.

10 Claims, 2 Drawing Sheets

(56) References Cited

U.S. PATENT DOCUMENTS

| | | | |
|---|---|---|---|
| 9,297,562 B2* | 3/2016 | Zhan | F16K 31/04 |
| 9,322,582 B2* | 4/2016 | Zhan | F16K 31/04 |
| 9,341,399 B2* | 5/2016 | Zhan | F25B 41/062 |
| 9,541,315 B2* | 1/2017 | Zhan | F16K 1/523 |

FOREIGN PATENT DOCUMENTS

| | | |
|---|---|---|
| CN | 102734476 | 10/2012 |
| CN | 104633148 | 5/2015 |
| CN | 104633212 | 5/2015 |
| CN | 104728459 | 6/2015 |
| CN | 106678421 | 5/2017 |
| CN | 107044547 | 8/2017 |
| JP | 4224187 | 2/2009 |

* cited by examiner

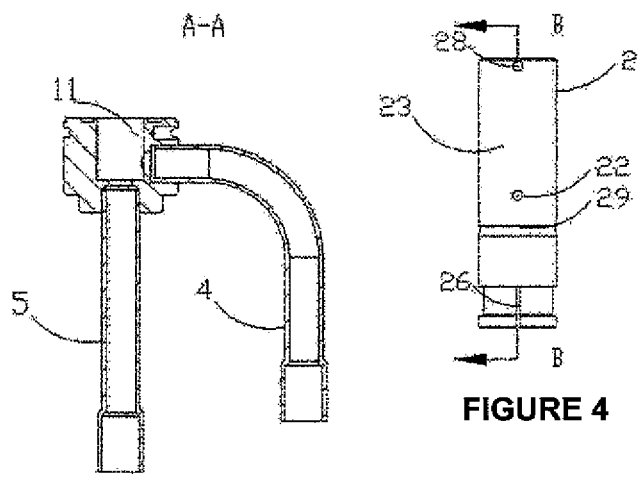
FIGURE 3
FIGURE 4
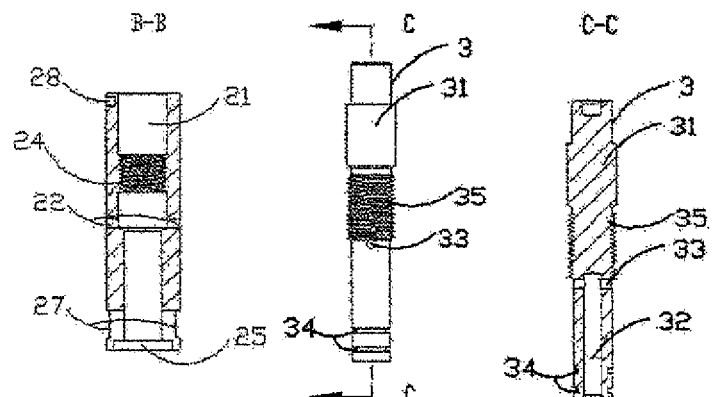
FIGURE 5
FIGURE 6
FIGURE 7

ELECTRONIC EXPANSION VALVE WITH HIGH FLOW CONTROL PRECISION

FIELD OF THE INVENTION

The present invention relates to an electronic expansion valve with high flow control precision.

BACKGROUND OF THE INVENTION

At present, there are a variety of electronic expansion valves of different structural characteristics at home and abroad, however they share similar throttle structure, primarily cone throttle. This kind of cone throttle, is not preferable as a result of its not ideal linearity relationship with the flow of expansion valves, that is to say, in a specific condition (e.g., when the pressure difference remains the same), flow rate is not proportionate to the opening degree, they appear to be curvilinear, just like a quadratic curve. This quadratic curve like flow characteristic is not conducive to precise flow control, as flow change doesn't appear to be the same as how much the expansion valves have been opened, consequently, it is quite difficult to control it and to render precise flow control. Therefore, in order to improve the flow characteristics of the numerical flow control, it is necessary to overcome the inherent defects of the cone valve structure, innovate the electronic expansion valve, and invent a more reasonable throttle structure. A reasonable throttle structure can essentially change the flow regulation characteristics of the numerical flow control, and thereby improve the performance of the numerical control flow, so that systematic requirements on the flow control can be met, and an accurate and energy-saving effect can be achieved.

SUMMARY OF THE INVENTION

The object of the present invention is to provide an electronic expansion valve with high flow control precision, which is capable of addressing the deficiencies and technical problems mentioned in the above background.

In order to achieve the above object, the present invention adopts the following technical solutions:

An electronic expansion valve with high flow control precision comprises a valve seat and a valve rod. A through groove penetrating the top and bottom of the valve seat is formed on the valve seat; a bearing seat matching the through groove is inserted in the through groove; the bearing seat includes a seat body, a through hole passing through the seat body is formed therein, the through hole matches with the valve rod, and an internal thread segment is formed in a middle portion of the inner wall of the through hole. A matching straight tube is welded to the bottom of the through groove. The outer wall of the valve seat is provided with a side hole communicating with the through groove, a matching elbow pipe is welded to the side hole. An isolating sleeve is welded to the outer wall of the valve seat, and a magnetic rotor is provided outside the upper end of the valve rod, wherein a second ring groove and a rectangular valve port are formed on the outer wall of the lower port of the seat.

Furthermore, the number of the rectangular valve ports may be two, four, or six, and the valve ports are symmetrical.

Still further, the bearing seat is made of PEEK or brass.

Yet further, a coaxially mounted limit static spring is provided on the outer wall of the bearing seat, a limit movable spring is embedded in the spiral groove of the limit static spring, and a block spring end of the magnetic rotor is in contact with a lateral cylinder of the limit movable spring.

A positioning groove is provided on the outer wall of the upper port of the bearing seat, and the positioning groove is used to fix the transverse groove of the limit static spring.

Yet still further, the valve rod includes a rod body, and on the outer wall of its central part is formed an external thread segment matching the internal thread section. On the middle and lower ends of the rod body is formed an internal axial column, and on the outer wall of the lower portion of the internal axial column is formed a first ring groove. A first transverse column communicating with the internal axial column is formed on an outer wall of the bottom of the internal axial column. A second transverse axial hole communicating with the through hole is formed in the middle portion of the wall of the bearing seat.

Still yet further, the number of the symmetric second transverse axial hole is two.

In addition, the first ring groove comprises two ring grooves, and are disposed at an upper and lower interval.

Additionally further, a circular groove is formed in the inner wall of the lower port of the seat, and a sealing ring is disposed thereof. The material used in the sealing ring is PTFE or PEEK.

Additionally still further, a fixing groove is formed on the outer wall of the middle end of the seat body.

Additionally yet further, a positioning hole for the limit static spring is provided on the outer wall of the upper end of the seat body.

Compared with the prior art, the present invention has the following beneficial effects:

The flow control precision of the electronic expansion valve of the invention is improved, in particular, through two first ring grooves on the valve rod and a second ring groove on the bearing seat. When air is introduced, the second ring groove is filled with air and it further flows into two symmetrical valve ports (the number of valve ports can be 2, 4 or 6 and they are symmetrical), thereby the rod will not move up and down or left and right.

The present invention further maintains a constant pressure around the two first ring grooves with the two first ring grooves, which prevents the valve rod from exerting a prone pressure when it is subject to air pressure. The flow rate of the air increases as the number of valve opening pulses increases, and flow characteristic curve thereof is linear.

It can be seen from the above description that the present invention can solve the deficiencies in the prior art, and in this way not only can the lateral pressure generated by the valve rod hit by air be eliminated, but also the flow control precision is improved, facilitating the system control and adjustment, a reduction in expenses, and the meeting of commercial requirements.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein:

FIG. 3 is a cross-sectional view taken along line A-A of FIG. 2;

FIG. 4 is a schematic view showing the structure of the bearing seat of the present invention;

FIG. 5 is a cross-sectional view taken along line B-B of FIG. 4;

FIG. 6 is a schematic view showing the structure of a valve rod of the present invention; and FIG. 7 is a cross-sectional view taken along line C-C of FIG. 6.

DETAILED DESCRIPTION OF THE PREFERRED EMBODIMENT

Figures 1, 2:
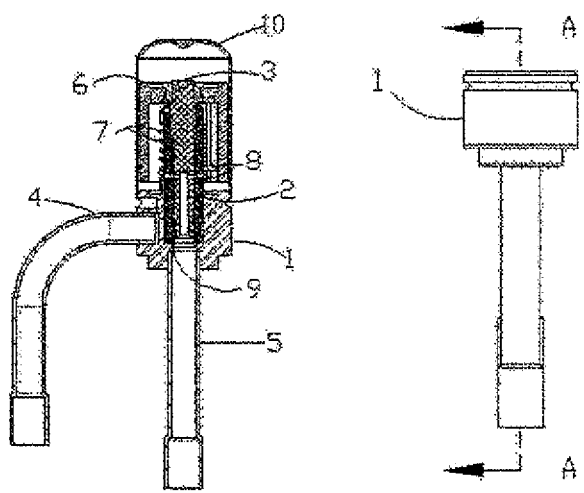
FIG. 1 is a schematic structural view of a flow control precision device on an electronic expansion valve of the present invention.
FIG. 2 is a schematic structural view of a valve body of the present invention.

The technical solutions of the present invention will be further specifically described below through various embodiments and with reference to the accompanying drawings.

As is shown in FIGS. 1-5, an electronic expansion valve with flow control precision includes a valve seat 1 and a valve rod 3, a through groove 11 penetrating the top and bottom of the valve seat 1 is formed on the valve seat 1, and a matching bearing seat 2 is inserted in the through groove and comprises a seat body 23. Inside the seat body 23 is formed a penetrating through hole 21, which matches with the valve rod 3, and an internal thread section 24 is formed in the middle of the inner wall of the through hole 21. A matching straight tube 5 is welded to the bottom end of the through groove 11, and on the outer wall of the valve seat 1 is provided a side hole communicating with the through groove 11, which in turn is welded to the matching elbow pipe 4. An isolation sleeve 10 is welded to the outer wall of the valve seat 1, and a magnetic rotor 6 is provided outside the upper end of the valve rod 3, wherein a second circular groove 27 and a rectangular valve port 26 are formed on the outer wall of the lower port of the seat body 23. In the present invention, the fixing groove 29 on the bearing seat 2 is fixed with a notch on the through groove 11 of the valve seat 1. The fixing groove 29 is located in the middle of the outer wall of the bearing seat 2; furthermore, valve rod 3 and bearing seat 2, fixed with inner thread section 24 and outer thread section 35 can be adjusted by rotating.

The valve rod 3 of the present invention includes a rod body 31, at the middle and lower part of which is formed an internal axial column 32, and on an outer wall of the lower end of which is formed a first circular groove 34. A first transverse column 33 communicating with the internal axial column 32 is formed on an outer wall of the bottom of the internal axial column 32. A second transverse axial hole 22 communicating with the through hole 21 is formed in a middle portion of the wall of the bearing seat 2.

In accordance with the present invention, the number of the first transverse column 33 is two, located along the same straight line; the number of the second transverse axial hole 22 is two, on the same straight line, and as is also the case with the number of the first ring groove 34.

In accordance with further disclosures of the present invention, a circular groove 25 is formed on the inner wall of the lower port of the seat body 23, and a second ring groove 27 and a rectangular valve port 26 are formed on the outer wall of the lower port of the seat body 23, the number of the rectangular valve ports may be set to be one pair or two pairs or three pairs, and they are symmetrical. The sealing ring 9 is provided within the circular groove 25, and the material of the sealing ring may be PEEK or PTFE. The upper end of the outer wall of the seat body 23 is provided with a positioning hole 28 for assembling the limit static spring 7.

The spiral groove in the limit static spring 7 described in the present invention is embedded a limit movable spring 8, which stays in the lowest position of the limit static spring 7 where the electronic expansion valve is fully closed. The block spring end of the magnetic rotor 6 is in contact with a transverse cylinder of the limit movable spring. The magnetic rotor 6 is disposed at an upper end of the outer wall of the valve rod 3. The isolating sleeve 10 is welded to the outer wall of the valve seat 1.

The flow control precision device of an electronic expansion valve according to the present invention mainly improves the flow control precision through the second circular groove 27 of the bearing seat 2 and the first circular groove 34 of the valve rod 3, thereby flow rate curve of which is linear. The specific description is as follows: when the air is introduced into the intake pipe of the electronic expansion valve, the second ring groove 27 is filled with air, and the air further flows into the two symmetric valve ports 26, wherein the number of valve ports can be two, four or six, and they are symmetrical, thereby the rod will not be moved up and down or left and right. Furthermore, the pressure at the two first ring grooves 34 is kept constant by the two first ring grooves 34, which prevents the valve rod 3 from exerting a prone pressure when it is subject to air pressure. The flow rate of the air increases as the number of valve opening pulses increases, and flow characteristic curve thereof is linear.

The above embodiments are only intended to illustrate the technical concept and the features of the present invention, and the purpose of the present invention is to enable those skilled in the art to understand the contents of the present invention and to implement the present invention. Equivalent variations or modifications made in accordance with the substance of the invention are intended to be included within the scope of the invention.

What is claimed is:

1. An electronic expansion valve with high flow control precision, comprising:
    a valve seat and a valve rod;
    a through groove penetrating the top and bottom of the valve seat is formed on the valve seat;
    a bearing seat matching the through groove is inserted in the through groove;
    the bearing seat includes a seat body, a through hole passing through the seat body is formed in the seat body, wherein the through hole matches the valve rod;
    an internal thread segment is formed in the middle of the inner wall of the through hole;
    a matched straight tube is welded to the bottom of the through groove;
    the outer wall of the valve seat is provided with a side hole which is in communication with the through groove;
    a matching elbow pipe is fixed to the side hole;
    an isolating sleeve is fixed to the outer wall of the valve seat;
    a magnetic rotor is provided outside the upper end of the valve rod; and
    a second circular groove and a rectangular valve port are formed on the outer wall of a lower open end of the seat body.

2. The electronic expansion valve with high flow control precision of claim 1, wherein:
    the number of rectangular valve ports may be two, four, or six, and the valve ports are symmetrical.

3. The electronic expansion valve with high flow control precision of claim 1, wherein:
    the bearing seat is made of PEEK or brass.

4. The electronic expansion valve with high flow control precision of claim 1, wherein:
   a coaxially mounted limit static spring is provided on the outer wall of the bearing seat;
   a limit movable spring is embedded in the spiral groove of the limit static spring;
   a block spring end of the magnetic rotor is in contact with a lateral cylinder of the limit movable spring;
   a positioning groove is provided on the outer wall of the upper port of the bearing seat; and
   said positioning groove is used for fixing the transverse groove of the limit static spring.

5. The electronic expansion valve with high flow control precision of claim 1, wherein:
   the valve rod includes a rod body, and an external thread segment matching the internal thread segment is formed on an outer wall of the middle portion of the rod body;
   on the middle and lower part of the rod body is formed an internal axial hole column;
   a first ring groove is formed on an outer wall of the lower portion of the internal axial hole column;
   a first transverse column communicating with the internal axial column is formed on an outer wall of the bottom of the internal axial column; and
   a second transverse axial hole communicating with the through hole is formed in a middle portion of the wall of the bearing seat.

6. The electronic expansion valve with high flow control precision of claim 5, wherein:
   the number of second transverse axial holes is two.

7. The electronic expansion valve with high flow control precision of claim 5, wherein:
   the number of the first ring groove is two, and are disposed at an upper and lower interval.

8. The electronic expansion valve with high flow control precision of claim 1, wherein:
   a circular groove is formed in the inner wall of the lower port of the seat, and a sealing ring is disposed thereon, wherein the material used in the sealing ring is PTFE or PEEK.

9. The electronic expansion valve with high flow control precision of claim 1, wherein:
   a fixing groove is formed on the outer wall of the middle end of the seat.

10. The electronic expansion valve with high flow control precision of claim 1, wherein:
    a positioning hole for limiting the static spring is provided on the outer wall of the upper end of the seat.

* * * * *